US009810977B2

(12) United States Patent
Akiyama

(10) Patent No.: US 9,810,977 B2
(45) Date of Patent: Nov. 7, 2017

(54) SOLID-STATE LIGHT SOURCE DEVICE AND PROJECTOR UTILIZING A PLURALITY OF COLLIMATOR LENSES

(75) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 346 days.

(21) Appl. No.: 13/287,413

(22) Filed: Nov. 2, 2011

(65) Prior Publication Data
US 2012/0133904 A1 May 31, 2012

(30) Foreign Application Priority Data
Nov. 29, 2010 (JP) ................................ 2010-265165

(51) Int. Cl.
G03B 21/20 (2006.01)
G02B 27/10 (2006.01)
G02B 27/48 (2006.01)
G03B 33/06 (2006.01)
H04N 9/31 (2006.01)
G02B 13/22 (2006.01)

(52) U.S. Cl.
CPC ......... G03B 21/204 (2013.01); G02B 27/102 (2013.01); G02B 27/48 (2013.01); G03B 21/208 (2013.01); G03B 21/2066 (2013.01); G03B 33/06 (2013.01); H04N 9/3158 (2013.01); H04N 9/3161 (2013.01); H04N 9/3164 (2013.01); G02B 13/22 (2013.01)

(58) Field of Classification Search
CPC ...... G03B 21/204; G03B 21/14; G03B 21/28; G03B 21/208; G03B 21/20; H05B 33/145; G02F 1/133617; G02B 26/008; H04N 9/3114; H04N 9/3197

USPC ............................... 353/38, 84, 94; 362/293
See application file for complete search history.

(56) References Cited

U.S. PATENT DOCUMENTS

| 6,324,013 | B1 | 11/2001 | Nakai |
| 6,547,421 | B2* | 4/2003 | Sugano ........................ 362/268 |
| 6,866,404 | B2* | 3/2005 | Yamauchi et al. ............ 362/299 |
| 8,287,132 | B2* | 10/2012 | Miyamae ............... G03B 21/14 353/31 |
| 8,403,492 | B2* | 3/2013 | Shibasaki ............ H04N 9/3161 353/102 |

(Continued)

FOREIGN PATENT DOCUMENTS

EP 1 548 803 A1 6/2005
EP 1 816 512 A1 8/2007
(Continued)

OTHER PUBLICATIONS

Michael Bass, Editor in Chief; Handbook of Optics: Classical optics, vision optics, X-ray optics; 2000; McGraw-Hill; vol. 3, 2nd Ed, Chapter 2; p. 2.33-2.38.*

(Continued)

Primary Examiner — Bao-Luan Le
(74) Attorney, Agent, or Firm — Oliff PLC

(57) ABSTRACT

A light source device includes a light source section adapted to emit excitation light, a lens array adapted to divide the excitation light into a plurality of partial light beams, a light collection optical system adapted to collect the excitation light divided into the plurality of partial light beams, and a light emitting element adapted to emit fluorescence by being excited by the excitation light.

11 Claims, 13 Drawing Sheets

(56) References Cited

U.S. PATENT DOCUMENTS

| | | | |
|---|---|---|---|
| 8,500,285 B2* | 8/2013 | Kimura et al. | 353/20 |
| 2002/0057419 A1* | 5/2002 | Fujimori et al. | 353/53 |
| 2002/0075460 A1* | 6/2002 | Kappel et al. | 353/102 |
| 2003/0002151 A1 | 1/2003 | Yano | |
| 2003/0214634 A1* | 11/2003 | Akiyama | 353/31 |
| 2004/0257670 A1 | 12/2004 | Kawakami | |
| 2005/0128435 A1* | 6/2005 | Yamauchi et al. | 353/20 |
| 2005/0146691 A1 | 7/2005 | Yano | |
| 2005/0225728 A1 | 10/2005 | Yano | |
| 2006/0164607 A1* | 7/2006 | Morejon et al. | 353/94 |
| 2010/0045944 A1 | 2/2010 | Yamada et al. | |
| 2010/0118411 A1 | 5/2010 | Nakajima | |
| 2010/0328554 A1* | 12/2010 | Shibasaki | H04N 9/3161 348/760 |
| 2011/0043762 A1* | 2/2011 | Miyamae | G03B 21/204 353/20 |
| 2011/0187998 A1* | 8/2011 | Kimura et al. | 353/20 |
| 2011/0234998 A1 | 9/2011 | Kurosaki | |
| 2012/0147601 A1* | 6/2012 | Li et al. | 362/231 |
| 2012/0230013 A1* | 9/2012 | Xu | 362/84 |

FOREIGN PATENT DOCUMENTS

| | | |
|---|---|---|
| JP | A-2002-328430 | 11/2002 |
| JP | A-2003-066367 | 3/2003 |
| JP | A-2004-220016 | 8/2004 |
| JP | A-2004-327361 | 11/2004 |
| JP | A-2007-233121 | 9/2007 |
| JP | A-2010-048926 | 3/2010 |
| JP | A-2010-204280 | 9/2010 |
| JP | A-2011-197597 | 10/2011 |
| WO | WO 2009/020014 A1 | 2/2009 |

OTHER PUBLICATIONS

Mar. 27, 2012 Search Report issued in European Patent Application No. 11189055.4.

* cited by examiner

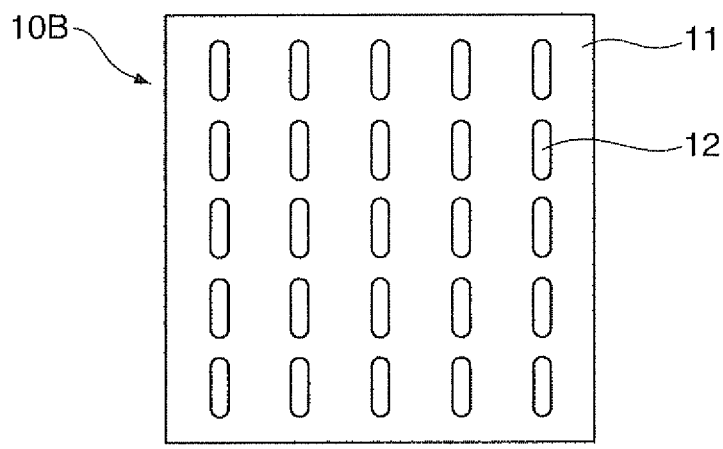
FIG. 2
FIG. 3A
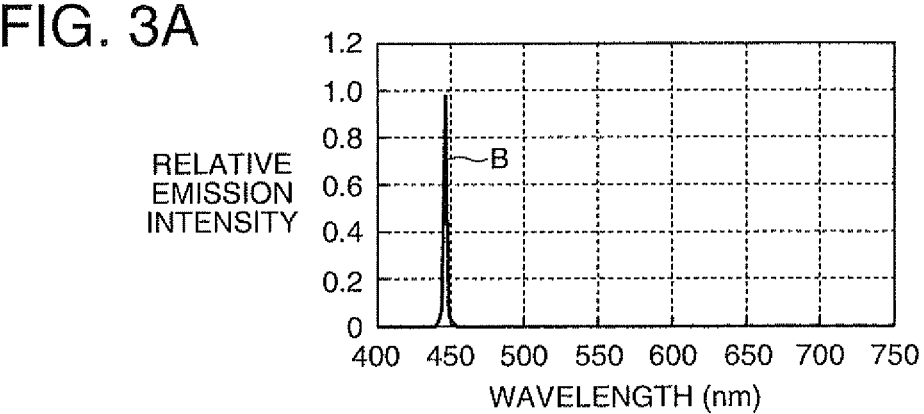
FIG. 3B
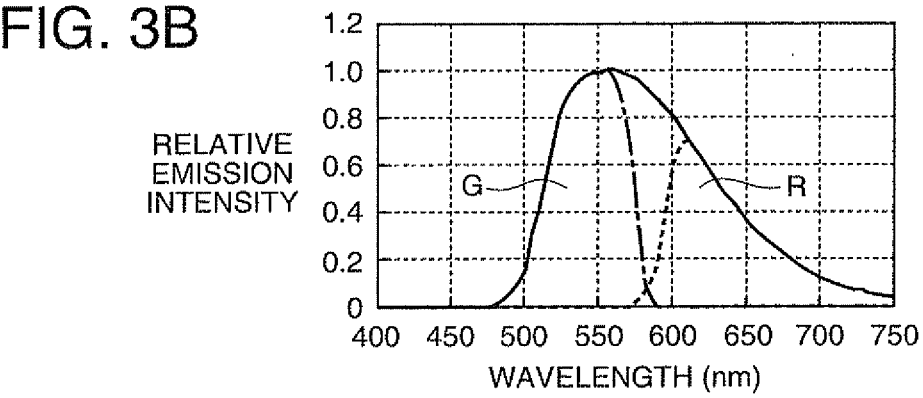

SOLID-STATE LIGHT SOURCE DEVICE AND PROJECTOR UTILIZING A PLURALITY OF COLLIMATOR LENSES

BACKGROUND

1. Technical Field

The present invention relates to a light source device and a projector.

2. Related Art

In the past, in the projector field, it has been common that the discharge lamp such as a super-high pressure mercury lamp has been used as the light source. However, the discharge lamp of this kind has a problem that the product life is relatively short, a problem that quick lighting is difficult, a problem that the ultraviolet light emitted from the lamp deteriorates the liquid crystal light valve, and so on. Therefore, there is proposed a projector using a light source of a type used instead of the discharge lamp.

For example, in the projector proposed in JP-A-2004-327361 (Document 1), there is used a light source which externally inputs excitation light to a fluorescent body, and then emits the luminescence (fluorescence) thus obtained. Specifically, in Document 1, the light source is proposed as a light source having the total area of the end face of the fluorescent body in the visible light emission direction set to be smaller than the total area of the excitation light emission end face thereof, and capable of emitting intense light from the smaller area than in the case of directly using the light source of the excitation light. According to this structure, there can be realized a bright projector which is high in light efficiency, low in cost, and low in power consumption.

However, in the light source described in Document 1, if too much light is collected in the fluorescent body, the amount of luminescence is reduced due to the following reason.

That is, if the intensity of the excitation light is high, the proportion of the electrons excited in the fluorescence molecule increases and the electrons (the electrons in the ground state) which can be excited decrease, and therefore, a so-called light saturation phenomenon occurs in which emission corresponding to the light intensity of the excitation light becomes unachievable. Thus, it results in that the luminance efficiency (the proportion of the luminance amount of the fluorescent body with respect to the incident light intensity of the excitation light) is degraded. Therefore, it is difficult to obtain a desired light intensity even in the case of using the light source disclosed in Document 1 and increasing the excitation light intensity attempting to obtain the intense light.

SUMMARY

An advantage of some aspects of the invention is to provide a light source device capable of preventing the degradation of the luminance efficiency to thereby emit the intense (high-intensity) light. Another advantage of some aspects of the invention is to provide a projector having such a light source device, and capable of high-quality image display.

As a result of repeated keen examinations on the problems described above, the inventors reach the knowledge that it is preferable that the light intensity of the excitation light is uniformized in the irradiation area as much as possible in view of the light saturation phenomenon described above. This is because in the case in which the excitation light is applied so that the fluorescent body emits the fluorescence with the light intensity as high as possible, if there is unevenness in the light intensity of the excitation light, then it is not achievable to preferably emit the fluorescence from the entire surface of the fluorescent body irradiated with the excitation light.

On the other hand, as the light source of the excitation light for making the fluorescent body preferably emit light, a solid-state light source such as a laser source is generally used, and further, a solid-state light source array using a plurality of solid-state light sources in order for increasing the light intensity is used. However, since the axes of the light beams emitted from the respective solid-state light sources are separate from each other in the solid-state light source array, if the solid-state light source array is used, there occurs the unevenness in the light intensity in the bundle of the light beams of the excitation light thus emitted in the solid-state light source array on the whole, such that the area in the vicinity of the light beam axis corresponding to each of the solid-state light source is bright while the area corresponding to the middle of the solid-state light sources is dark. Therefore, it results in that the efficient luminance becomes difficult such that the fluorescence is emitted from the entire surface of the fluorescent body without causing the light saturation on the fluorescent body.

An aspect of the invention is directed to a light source device including a light source section including a plurality of solid-state light sources adapted to emit excitation light, and adapted to emit the excitation light as a parallel beam of light, a lens array adapted to divide the excitation light into a plurality of partial light beams, a light collection optical system adapted to collect the excitation light divided into the plurality of partial light beams, and a light emitting element adapted to emit fluorescence by being excited by the excitation light collected by the light collection optical system.

According to this configuration, the excitation light emitted from the plurality of solid-state light sources and having a discrete light intensity distribution overlaps on the light emitting element via the lens array and the light collection optical system, and thus the light intensity distribution is averaged. Therefore, it becomes possible to irradiate the entire light emitting element with the excitation light having the homogenized light intensity, and thus, it becomes easy to control the light intensity of the excitation light so as not to cause the light saturation in the area irradiated with the excitation light. Therefore, it is possible to obtain the light source device capable of easily preventing the degradation of the luminance efficiency to thereby stably emit intense light.

Firstly, in the light source device of the above aspect of the invention, it is preferable that the light collection optical system includes a second lens array which the plurality of partial light beams enter, the second lens array forming a pair together with the lens array, and which the partial light beams enter, and an overlapping optical system adapted to make the plurality of partial light beams emitted from the second lens array overlap with each other on the light emitting element, and a lens plane of the lens array and a light irradiation surface of the light emitting element are in a conjugate relationship via the light collection optical system.

According to this configuration, since the plurality of partial light beams preferably overlaps on the light irradiation surface of the light emitting element, the light intensity distribution can easily be averaged, and it becomes easy to control the light intensity of the excitation light so as not to cause the light saturation of the light emitting element.

In the light source device of the aspect of the invention described above, it is preferable that a planar shape of a small lens constituting the lens array is similar to a planar shape of the light irradiation surface, and a planar area of the light irradiation surface and an irradiation area of the excitation light illuminating a plane parallel to the light irradiation surface at a same spatial position as the light irradiation surface are substantially equal to each other.

According to this configuration, since the excitation light can be applied to the light emitting element without waste, the amount of fluorescence taken out with respect to the amount of the excitation light applied can be maximized.

In the light source device of the aspect of the invention described above, it is preferable that the light source section includes a collecting lens adapted to collect the excitation light emitted from the plurality of solid-state light sources, and a collimating lens adapted to collimate the excitation light emitted from the collecting lens, and the collimating lens has a concave surface having a shape of a quadric surface of revolution in either one of an entrance surface and an exit surface.

According to this configuration, since the degree of parallelization of the excitation light entering the lens array can be enhanced, averaging of the excitation light using the lens array and the light collection optical system is easily controlled as designed, and the degradation of the luminance efficiency can easily be prevented.

In the light source device of the aspect of the invention described above, it is preferable that the collimating lens has a spherical convex surface as the entrance surface, and the concave surface as the exit surface.

According to this configuration, it is difficult to generate the unevenness in the intensity distribution due to the transmission through the collimating lens in the excitation light entering the lens array, and it is easy to perform the averaging of the excitation light using the lens array and the light collection optical system. Therefore, it becomes easy to make the light emitting element emit light while preventing the light saturation.

Secondly, in the light source device of the above aspect of the invention, it is preferable that the light emitting element is disposed so that the light irradiation surface overlaps a focal position of the light collection optical system, and an integrate optical system has a plane, which is conjugate to the light irradiation surface, set to infinity, the integrate optical system having the lens array in one end of the integrate optical system and the light collection optical system in the other end of the integrate optical system.

According to this configuration, the excitation light to the light emitting element can be made to overlap by setting the relative position between the light collection optical system and the light emitting element even without precisely setting the relative position between the light collection optical system and the lens array. Further, since the excitation light is not imaged at the focal position, the image of the excitation light blurs, and it is easy to average the light intensity. Therefore, it becomes easy to control the light intensity of the excitation light so as not to cause the light saturation in the light emitting element.

In the light source device of the aspect of the invention described above, it is preferable that a planar shape of a small lens constituting the lens array is similar to a planar shape of the light irradiation surface of the light emitting element, and a planar area of the light irradiation surface of the light emitting element is substantially equal to a size of an exit pupil of the integrate optical system.

According to this configuration, since the excitation light can be applied to the light emitting element without waste, the amount of fluorescence taken out with respect to the amount of the excitation light applied can be maximized.

In the light source device of the aspect of the invention described above, it is preferable that the light source section includes a collecting lens adapted to collect the excitation light emitted from the plurality of solid-state light sources, and a collimating lens adapted to collimate the excitation light emitted from the collecting lens, and the collimating lens has a concave surface having a shape of a quadric surface of revolution in either one of an entrance surface and an exit surface.

According to this configuration, since the degree of parallelization of the excitation light entering the lens array can be enhanced, averaging of the excitation light using the lens array and the light collection optical system is easily controlled as designed, and the degradation of the luminance efficiency can easily be prevented.

In the light source device of the aspect of the invention described above, it is preferable that the collimating lens has the concave surface as the entrance surface, and a flat surface as the exit surface.

According to this configuration, since the degree of parallelization of the excitation light transmitted through the collimating lens can further be enhanced, it is easy to perform the averaging of the excitation light using the lens array and the light collection optical system, and it becomes easy to make the light emitting element emit light while preventing the light saturation.

In the light source device of the aspect of the invention described above, it is preferable that assuming that coordinate values in an rθZ cylindrical coordinate system taking an intersecting point between the concave surface and a center axis of the parallel beam of light as an origin, the center axis as a Z axis, and an axis perpendicular to the center axis as an r axis are r and Z, a paraxial curvature is c, and a conic constant is K, the concave surface has a shape represented by Formula (1) below.

$$Z - \frac{c \cdot r^2}{1 + \sqrt{1 - (1 + K) \cdot c^2 \cdot r^2}} = 0 \quad (1)$$

According to this configuration, the shape of the concave surface can easily be determined. Further, since the spherical aberration can be reduced by using the lens having the aspherical surface determined in accordance with this formula, the degree of parallelization of the light emitted from the light source device can further be enhanced.

Another aspect of the invention is directed to a projector including the light source device of any one of the aspects of the invention described above, a light modulation element adapted to modulate light emitted from the light source device, and a projection optical system adapted to project the light modulated by the light modulation element.

According to this configuration, since the light source device described above is provided, the light saturation phenomenon is prevented from occurring, and therefore the light intensity of the light emitted from the light source device is stabilized, and thus the projector capable of suppressing the variation in brightness to thereby perform high-quality image display can be provided.

BRIEF DESCRIPTION OF THE DRAWINGS

The invention will be described with reference to the accompanying drawings, wherein like numbers reference like elements.

FIG. 2 is a front view of a light source section included in the light source device according to the first embodiment.

FIGS. 3A and 3B are graphs showing the emission characteristics of the light source and a light emitting element.

DESCRIPTION OF EXEMPLARY EMBODIMENTS

First Embodiment

Hereinafter, a light source device and a projector according to a first embodiment of the invention will be explained with reference to FIGS. 1 through 13. It should be noted that in all of the drawings described below, the sizes and the ratios between the sizes of the constituents are arbitrarily made different from each other in order for making the drawings eye-friendly.

Figure 1:
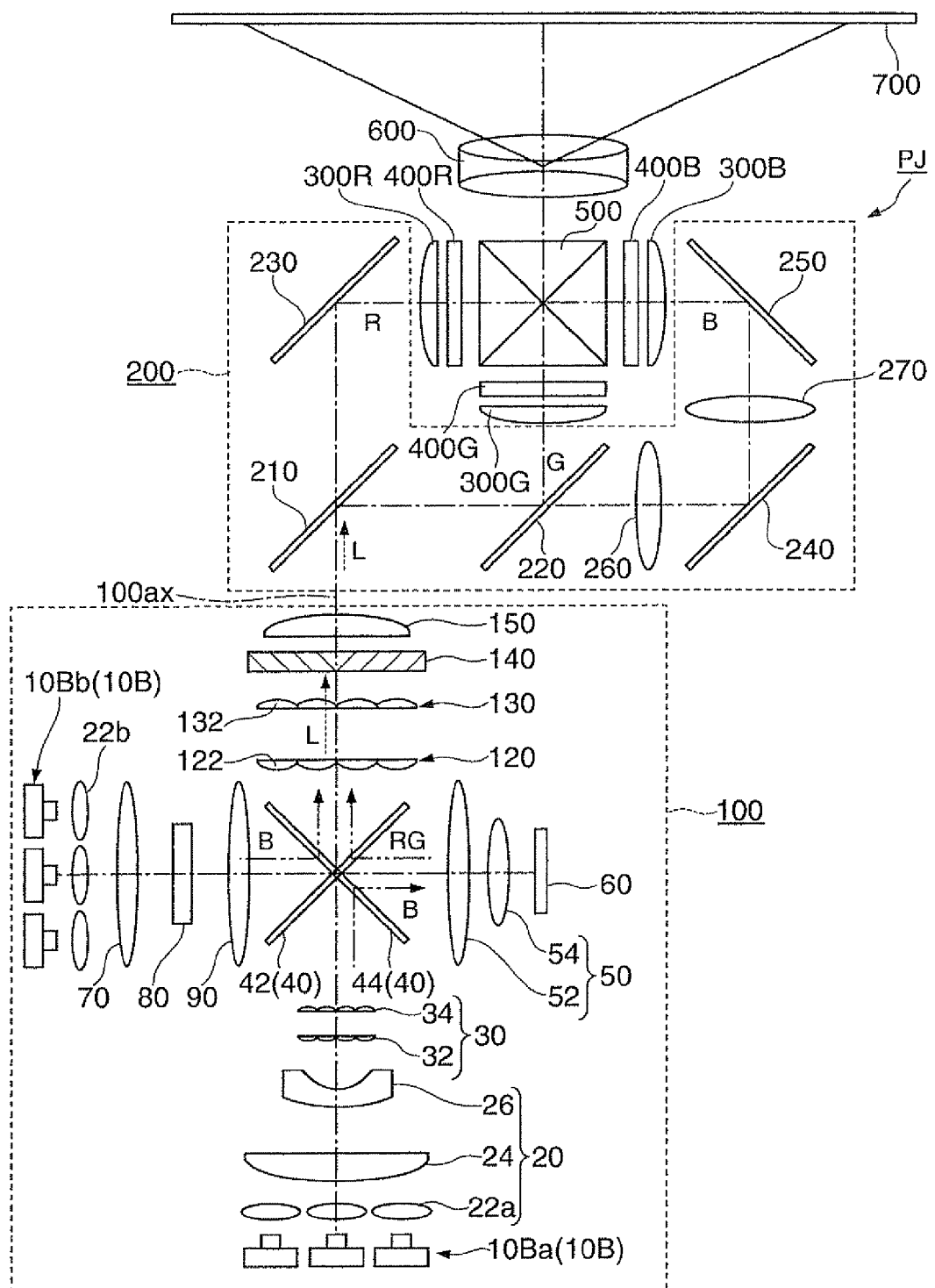
FIG. 1 is a schematic diagram showing a light source device and a projector according to a first embodiment of the invention.

FIG. 1 is a schematic diagram showing the light source device 100 and the projector PJ according to the present embodiment. As shown in the drawing, the projector PJ includes the light source device 100, a color separation optical system 200, a liquid crystal light valve (light modulation element) 400R, a liquid crystal light valve 400G, a liquid crystal light valve 400B, a color combining element 500, and a projection optical system 600.

The projector PJ generally operates as follows. The light emitted from the light source device 100 is separated by the color separation optical system 200 into a plurality of colored lights. The plurality of colored lights thus separated into by the color separation optical system 200 enters and is then modulated by the corresponding liquid crystal light valves 400R, 400G, and 400B, respectively. The respective colored lights modulated by the liquid crystal light valves 400R, 400G, and 400B enter and are then combined by the color combining element 500. The light thus combined by the color combining element 500 is projected by the projection optical system 600 on a target projection surface 700 such as a wall or a screen in an enlarged manner, and thus a full-color projection image is displayed.

Hereinafter, each of the constituents of the projector PJ will be explained.

The light source device 100 has two light sources 10B (a first light source 10Ba, a second light source 10Bb) for emitting the blue light.

The light source device 100 has a configuration in which the light source 10Ba, a collimating optical system 20, a lens integrator 30, a light wavelength selecting optical system 40, an overlapping optical system 50, a light emitting element 60, lens array 120, lens array 130, a polarization conversion element 140, and an overlapping lens 150 disposed in this order when viewed along the light path of the light emitted from the light source 10Ba.

Here, the light source 10Ba and the collimating optical system 20 constitute a light source section in the embodiment of the invention. Further, a second lens array 34 and the overlapping optical system 50 constitute a light collection optical system in the embodiment of the invention. Here, the second lens array 34 is included in the lens integrator 30.

Further, the light source device 100 has a configuration in which the light source 10Bb, a collimator lens array 22b, a collecting lens 70, a diffuser 80, a collimating lens 90, the light wavelength selecting optical system 40, the lens array 120, lens array 130, the polarization conversion element 140, and the overlapping lens 150 disposed in this order when viewed along the light path of the light emitted from the light source 10Bb.

In the light source device 100 having such a configuration, the blue light emitted from the light source 10Ba is applied to the light emitting element 60, and is used as the excitation light for making the fluorescence be emitted from the fluorescent body provided to the light emitting element 60. The fluorescence emitted from the light emitting element 60 is mixed with the blue light emitted from the light source 10Bb on the light path, and is then emitted from the light source device 100 as a white light L used as the illumination light for the liquid crystal light valves.

Hereinafter, each of the constituents will be explained first while explaining the behavior of the light emitted from the first light source 10Ba, and then each of the constituents will be explained while explaining the behavior of the light emitted from the second light source 10Bb.

FIG. 2 is a front view of the light source 10Ba. As shown in the drawing, the light source 10Ba is a laser source array having laser sources (solid-state light sources) 12 arranged in a 5×5 two-dimensional array (25 in total) so as to form a square shape on a substrate 11. The laser sources 12 each have a rounded rectangular planar shape, and are arranged so that the long axis directions thereof are the same.

The light source 10Ba emits a blue (having a peak emission intensity at about 445 nm; see FIG. 3A) laser beam as the excitation light for exciting the fluorescent material provided to the light emitting element 60. What is denoted with the symbol B in FIG. 3A is a colored light component emitted by the light source 10Ba as the excitation light. It should be noted that it is also possible to assume that just one laser source is used instead of the laser source array shown in FIG. 2. Further, the light source for emitting the colored light having a peak wavelength other than 445 nm can also be adopted providing the light has the wavelength capable of exciting the fluorescent material described later. In FIG. 1, the excitation light emitted from the light source 10Ba is denoted by the reference symbol B.

Figure 4:
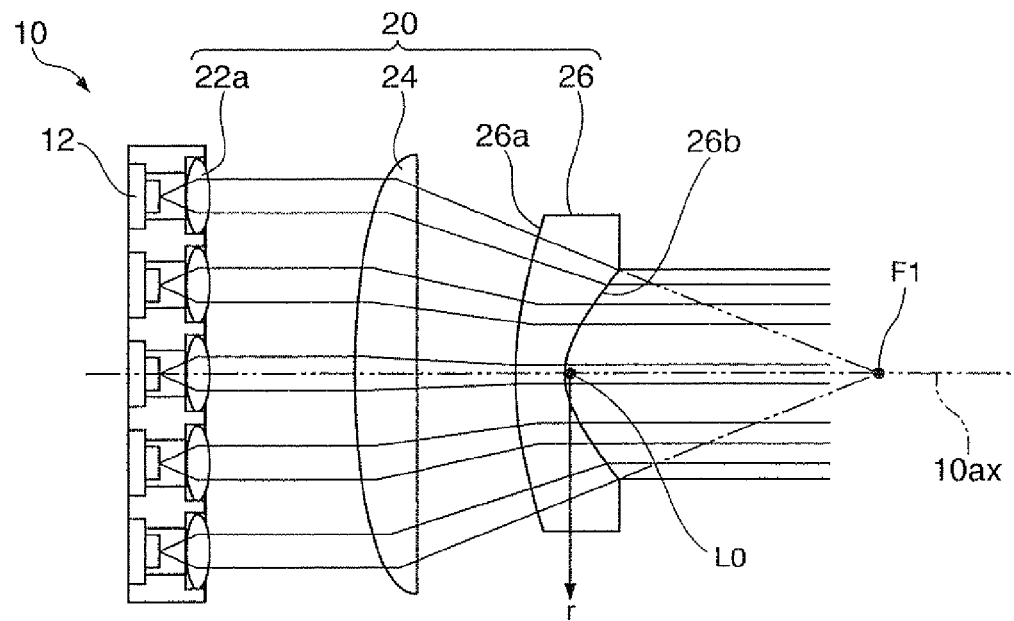
FIG. 4 is a side view of the light source section included in the light source device according to the first embodiment.

FIG. 4 is a side view of the light source 10Ba. As shown in the drawing, the excitation light emitted from the light source 10Ba is collimated by a first collimator lens array 22a included in the collimating optical system 20. Subsequently, the light beam of the excitation light collected by a collecting lens 24 proceeds toward a focal point F1 of the collecting lens 24, and is then collimated again by a collimating lens 26. By being transmitted through such a collimating optical system 20, the excitation light is narrowed in the total width of the bundle of the light beams.

Here, the collimating lens 26 has an entrance surface 26a formed as a convex surface having a spherical shape and an exit surface 26b formed as a concave surface having an aspherical shape. In further specific explanation of the shape of the exit surface 26b, the aspherical shape of the exit surface 26b of the collimating lens 26 is arranged to be a shape approximately fulfilling the relationship expressed by Formula (2). Specifically, in the exit surface 26b, it is arranged that the light with a high degree of parallelization can be emitted by adopting a shape of a quadric surface of revolution as the aspherical shape of the exit surface 26b.

$$Z - \frac{c \cdot r^2}{1 + \sqrt{1 - (1+K) \cdot c^2 \cdot r^2}} - \sum An \cdot r^n = 0 \quad (2)$$

Here, "r" and "Z" are coordinate values in the rθZ cylindrical coordinate system taking the intersecting point between the exit surface 26b of the collimating lens 26 and the center axis 10ax of the bundle of the light beams of the excitation light as the origin L0, and axisymmetrical about the center axis 10ax as shown in FIG. 4. It should be noted that in FIG. 4 the Z direction takes the emission direction of the excitation light as the positive direction. The symbol "r" represents the distance from the origin L0 in the direction perpendicular to the center axis 10ax. The symbol "θ" represents the angle with the predetermined r direction, but the aspherical shape does not depend on the angle θ as is understood from Formula (2).

Further, in Formula (2), the paraxial curvature c represents the curvature of a spherical shape in the case of assuming that the light beam of the excitation light collected by the collecting lens 24 is converted into a parallel beam of light using a plano-concave lens having the spherical shape. In other words, it results that in the paraxial area (the area adjacent to the rotational axis), the light beam of the excitation light collected by the collecting lens 24 can be converted into a parallel beam of light by using the plano-concave lens having the curvature c.

The symbol "K" is a value called a conic constant. The shape of the quadric surface of revolution is limited to a specific shape depending on the value of the conic constant K. Specifically, if the value of the conic constant K fulfills −1<K<0, the aspherical surface becomes an ellipsoid of revolution. Further, if the value of the conic constant K fulfills K=−1, the aspherical surface becomes a paraboloid of revolution. Still further, if the value of the conic constant K fulfills K<−1, the aspherical surface becomes a hyperboloid of revolution.

Further, the third term of the left-hand side is a function called a general aspheric term and depending on the distance r, but is a sufficiently small value, and is therefore disregarded in the present embodiment.

The shape of the quadric surface of revolution of the aspherical surface of the collimating lens 26 in the present embodiment is determined by the following method based on Formula (3) below in which the third term of the left-hand side in Formula (2) is disregarded.

$$Z - \frac{c \cdot r^2}{1 + \sqrt{1 - (1+K) \cdot c^2 \cdot r^2}} = 0 \quad (3)$$

Firstly, the value of the paraxial curvature c is obtained in consideration of the shape of the collecting lens 24, the curvature of the entrance surface 26a of the collimating lens 26, the refractive index n of the collimating lens 26, the thickness of the central part of the collimating lens 26, and the installation location of the collimating lens 26.

Specifically, the shape of the collecting lens 24, and the curvature of the entrance surface 26a, the refractive index n, the thickness of the central part, and the installation location of the collimating lens 26 are firstly determined in advance. Further, a concave lens having the curvature of the entrance surface, the refractive index, and the thickness of the central part identical thereto, and at the same time having the spherical exit surface is assumed as an alternative of the collimating lens 26. Then, the curvature of the exit surface of the concave lens is obtained, with which the transmitted light can be converted into parallel light in the paraxial area (the area adjacent to the rotational axis) in the case in which the concave lens described above is disposed at the installation location of the collimating lens 26 with respect to the collecting lens having the shape identical to the shape determined in advance.

The value of the curvature thus obtained is the paraxial curvature c in Formula (3) defining the shape of the exit surface 26b. Here, if the entrance surface 26a of the collimating lens 26 is set to a plane surface, the curvature of the entrance surface 26a is set to 0.

Then, the conic constant K is obtained. In the light source device 100 of the present embodiment, the conic constant K is set to a condition with which the parallel light is emitted by performing a simulation repeatedly using Formula (3) while varying the value thereof. In this simulation, it is possible to take the case, in which the diameter of a light spot at a focal point becomes the smallest when a bundle of the light beams emitted from the light source device 100 is collected by an ideal lens without aberration, as the condition of emitting the approximately parallel light.

By using the collimating lens 26 designed in such a manner as described above, it is possible to make the excitation light transmitted through the collimating optical system 20 to be the light with a high degree of parallelization.

The excitation light transmitted through the collimating optical system 20 enters the lens integrator 30. The lens integrator 30 has a first lens array 32 and the second lens array 34, these lens arrays are arranged on the light path in this order. The first lens array 32 and the second lens array 34 are for homogenizing the brightness distribution of the light emitted from the collimating optical system 20.

The excitation light transmitted through the lens integrator 30 enters the light wavelength selecting optical system 40. The light wavelength selecting optical system 40 has a dichroic mirror 42 and a dichroic mirror 44. The dichroic mirrors 42, 44 are each formed by, for example, stacking a dielectric multilayer film on a glass surface.

The dichroic mirrors 42, 44 have the wavelength selectivity of selectively reflecting the colored light in the wavelength band of the excitation light, and transmitting the colored light in the other wavelength band. Specifically, the dichroic mirror 42 reflects the blue light, and transmits the light (e.g., the light with the wavelength longer than 480 nm) with the wavelength longer than the blue light. On the other hand, the dichroic mirror 44 transmits the blue light, and reflects the light (e.g., the light with the wavelength longer than 480 nm) with the wavelength longer than the blue light. Here, the excitation light is transmitted through the dichroic mirror 44, and at the same time reflected by the dichroic mirror 42.

The excitation light reflected by the dichroic mirror 42 enters the overlapping optical system 50, and is then imaged on the light emitting element 60.

Figure 5:
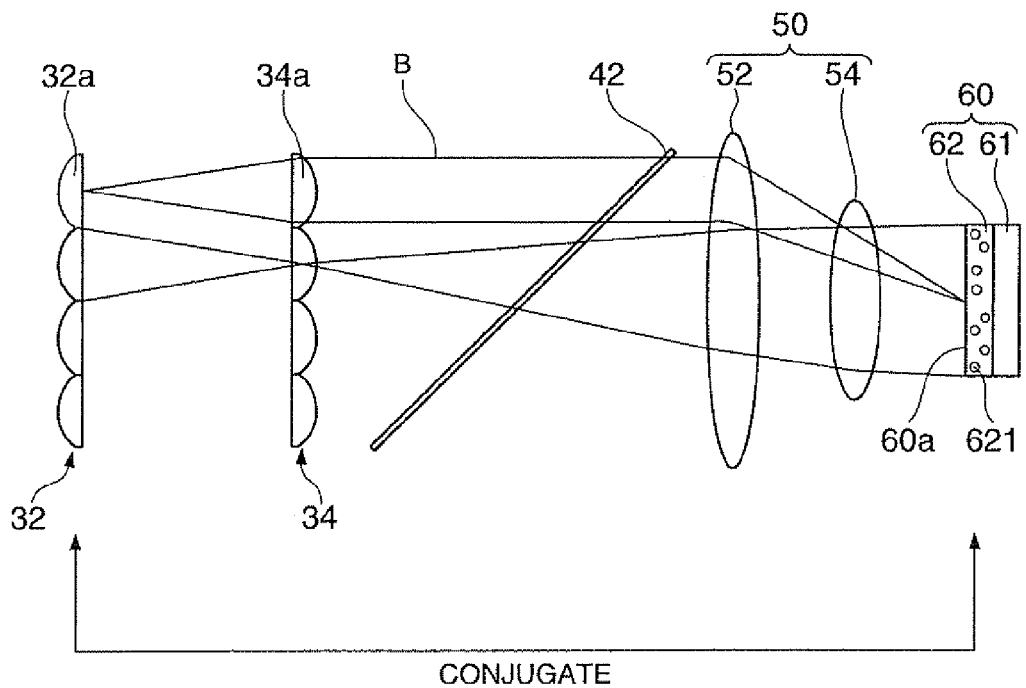
FIG. 5 is an explanatory diagram showing a behavior of excitation light having entered a lens integrator.

FIG. 5 illustrates the behavior of the excitation light until the excitation light (the blue light B) having entered the lens integrator 30 is applied to the light emitting element 60.

As shown in FIG. 5, the first lens array 32 includes a plurality of first small lenses 32a, and the second lens array 34 includes a plurality of second small lenses 34a. Further, the planar shape of the first small lense 32a and the planar shape of the second small lense 34a are arranged to be roughly similar to the planar shape of a light irradiation surface 60a of the light emitting element 60.

In the first lens array 32 and the second lens array 34, one of the first small lenses 32a and one of the second small lenses 34a correspond to each other in a one-to-one manner. The light emitted from the collimating optical system 20 enters the plurality of first small lenses 32a while being spatially separated, and each of the first small lenses 32a images the incident light on corresponding one of the second small lenses 34a. Thus, the secondary light source image is formed in each of the second small lenses 34a.

Further, the light emitted from each of the second small lenses 34a is collected by the overlapping optical system 50 configured including a first lens 52 and a second lens 54 via the dichroic mirror 42, and is then imaged on the light emitting element 60. In other words, the light collection optical system configured including the second lens array 34 and the overlapping optical system 50 images the incident light on the light irradiation surface 60a of the corresponding light emitting element 60.

As shown in FIG. 5, the light emitting element 60 has a plate like substrate 61 and a fluorescent layer 62 formed on the excitation light entrance side surface of the substrate 61. The fluorescent layer 62 is formed to have, for example, a roughly square shape of 1 mm×1 mm in a plan view, and has fluorescent particles 621 for emitting fluorescence. Such a fluorescent layer 62 has a function of absorbing the excitation light (the blue light) and converting it into yellow (having the peak emission intensity at about 550 nm; see FIG. 3B) fluorescence.

The component indicated by the reference symbol R in FIG. 3B is a colored light component available as the red light out of the yellow light emitted by the fluorescent layer 62, and the component indicated by the reference symbol G is a colored light component available as the green light similarly. In FIG. 1, the red light is denoted by the reference symbol R, the green light is denoted by the reference symbol G, and the fluorescence including the red light R and the green light G is denoted by the reference symbol RG.

In such a configuration, the optical system configured including the second lens array 34 and the overlapping optical system 50 is preferably configured so that the lens plane of the first lens array 32 and the light irradiation surface 60a of the light emitting element 60 are in a conjugate relationship. Specifically, it is preferable that it is configured so that the object plane of the optical system configured including the second lens array 34 and the overlapping optical system 50 coincide with the lens plane of the first lens array 32, and the image plane thereof coincide with the light irradiation surface 60a of the light emitting element 60. Thus, it results that the light irradiation surface 60a is irradiated with the excitation light having the homogenized intensity distribution.

Here, "the lens plane of the first lens array 32" denotes an imaginary plane connecting the valleys between the first small lenses 32a provided to the first lens array 32.

Figure 6A:
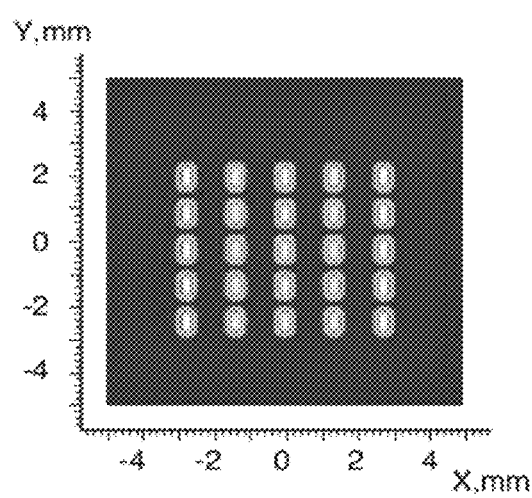
FIGS. 6A through 6C are diagrams showing a calculation result representing the light intensity of the excitation light in a plane perpendicular to a principal ray of the excitation light.
Figure 6B:
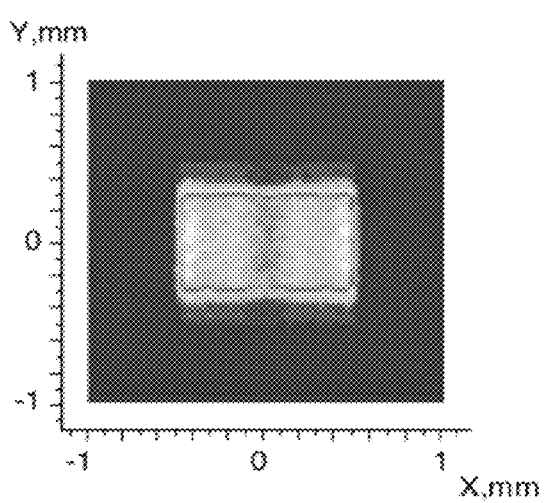
Figure 6C:
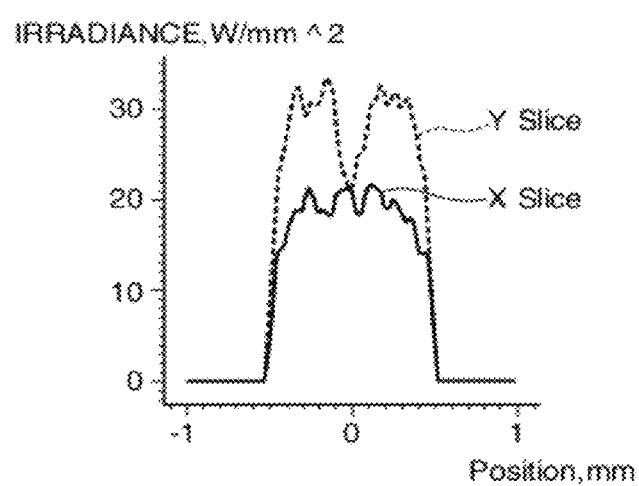

FIGS. 6A through 6C show the calculation result representing the light intensity of the excitation light on a plane perpendicular to the principal ray of the excitation light, wherein FIG. 6A is a distribution chart showing the light intensity of the excitation light entering the first lens array 32, and FIG. 6B is a distribution chart showing the light intensity of the excitation light entering the light irradiation surface 60a. In FIGS. 6A and 6B, it is arranged that the higher the light intensity of the place is, the brighter the place is, and the lower the light intensity of the place is, the darker the place is to thereby display the light intensity in correspondence with the luminance of the area.

Further, FIG. 6C is a graph showing the light intensity in the area passing through the origin and along the x axis and the y axis in the distribution chart of FIG. 6B. The horizontal axis of FIG. 6C represents the location (the coordinate) on the x axis or the y axis in the area shown in FIG. 6B, and the vertical axis thereof represents the light intensity (the irradiance).

As shown in FIG. 6A, in the spatial position before entering the first lens array 32, bright sections and dark sections exist discretely in the light intensity distribution of the excitation light in accordance with the light source 10Ba shown in FIG. 2. In contrast, as shown in FIG. 6B, in the spatial position before entering the light irradiation surface 60a, the excitation light is formed to have an approximately square shape of 1 mm×1 mm, and has a continuous light intensity distribution approximating the light intensity distribution of a so-called top hat profile in which the light intensity is roughly uniform throughout the entire area of the light irradiation surface 60a as shown in FIG. 6C.

The light emitting element 60 is irradiated with the excitation light having the light intensity distribution approximating the homogenized distribution compared to that of the excitation light before transmitting through the lens integrator 30 as described above. Further, the excitation light applied thereto is formed to have a shape roughly the same as the planar shape of the light emitting element 60. Therefore, it becomes easy to irradiate the entire area of the light irradiation surface 60a of the light emitting element 60 so as not to cause the light saturation inside the surface thereof. Therefore, the light emitting element 60 can be used as the secondary light source for preferably emitting the fluorescence RG from the entire area of the light irradiation surface 60a.

The overlapping optical system 50 functions as a pickup optical system with respect to the fluorescence RG emitted from the light emitting element 60. Therefore, the fluorescence RG enters the light wavelength selecting optical system 40 after collimated by the overlapping optical system 50. In the light wavelength selecting optical system 40, the fluorescence RG is reflected by the dichroic mirror 44, and then emitted toward the lens array 120.

Then, each of the constituents will be explained while explaining the light emitted from the second light source 10Bb.

The light source 10Bb has substantially the same configuration as that of the light source 10Ba shown in FIG. 2, and is formed of a laser source array for emitting the blue light. The blue light emitted from the light source 10Bb is collimated by the second collimator lens array 22b, and is then collected by the collecting lens 70.

The diffuser 80 is disposed at the focal position of the collecting lens 70. The diffuser 80 has a function of scattering the light transmitted therethrough. The blue light, which is coherent light, emitted from the light source 10Bb is scattered by the diffuser 80 to thereby provide a light path difference in the blue light, and thus the coherency is lowered. Therefore, it becomes difficult to cause the interference pattern called speckle when projected on the target projection surface 700.

The blue light transmitted through the diffuser 80 enters and is then collimated by the collimating lens 90, then enters the light wavelength selecting optical system 40, and is then reflected by the dichroic mirror 42 to thereby be emitted toward the lens array 120. Therefore, the light emitted from the light wavelength selecting optical system 40 becomes the white light L obtained by mixing the fluorescence RG including the red light and the green light mixed with each other and emitted from the light emitting element 60, and the blue light B emitted from the light source 10Bb.

It should be noted that although it is assumed in the present embodiment that the light source 10Bb is the laser source array, the light source 10Bb is not required to be the laser source array providing the light source 10Bb can emit the blue light used for display.

The lens arrays 120, 130 are for homogenizing the luminance distribution of the white light L emitted from the light wavelength selecting optical system 40. The lens array 120 includes a plurality of first small lenses 122, and the lens array 130 includes a plurality of second small lenses 132. In the lens array 120 and the lens array 130, the first small lenses 122 and the second small lenses 132 correspond to each other in a one-to-one manner. The light L emitted from the light wavelength selecting optical system 40 enters the plurality of first small lenses 122 while being spatially separated, and each of the first small lenses 122 images the incident light on corresponding one of the second small lenses 132. Thus, the secondary light source image is formed in each of the second small lenses 132. It should be noted that the outer shape of the first small lenses 122 and the second small lenses 132 is arranged to be roughly similar to the outer shape of the image forming areas of the respective liquid crystal light valves 400R, 400G, and 400B.

Figure 7:
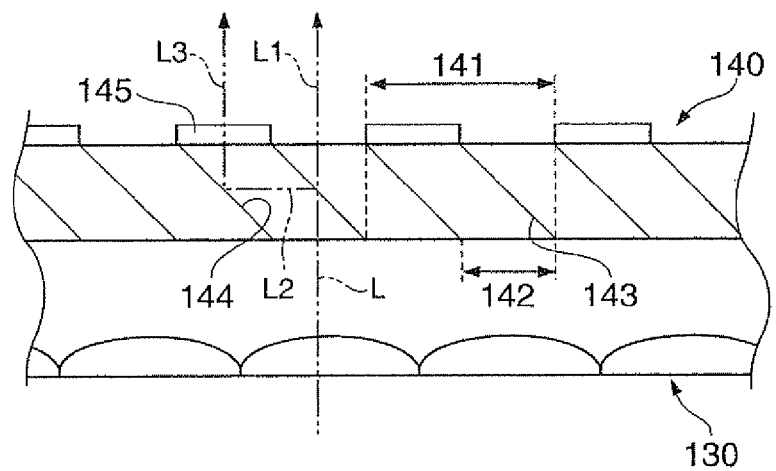
FIG. 7 is a schematic explanatory diagram of a polarization conversion element.

The polarization conversion element 140 is for aligning the polarization state of the light L emitted from the lens arrays 120, 130. As shown in FIG. 7, the polarization conversion element 140 includes a plurality of polarization conversion cells 141. The polarization conversion cells 141 correspond to the second small lenses 132 in a one-to-one manner. The light L from the secondary light source image formed on each of the second small lenses 132 enters an entrance area 142 of corresponding one of the polarization conversion cells 141.

Each of the polarization conversion cells 141 is provided with a polarization beam splitter film 143 (hereinafter referred to as a PBS film 143) and a retardation plate 145 so as to correspond to the entrance area 142. The light L having entered the entrance area 142 is split by the PBS film 143 into P-polarized light L1 and S-polarized light L2 with respect to the PBS film 143. One (here the S-polarized light L2) of the P-polarized light L1 and the S-polarized light L2 is reflected by a reflecting member 144, and then enters the retardation plate 145. The S-polarized light L2 having entered the retardation plate 145 is converted in the polarization state into the polarization state of the other polarized light (here the P-polarized light L1) by the retardation plate 145 to thereby become P-polarized light L3, and is then emitted together with the P-polarized light L1.

The overlapping lens 150 is for making the lights emitted from the polarization conversion element 140 overlap with each other in the illuminated area. The light emitted from the light source device 100 is spatially divided and then overlapped to thereby be homogenized in the luminance distribution, and enhanced in the axisymmetric property around the light beam axis 100ax.

The color separation optical system 200 includes dichroic mirrors 210, 220, mirrors 230, 240, and 250, field lenses 300R, 300G, and 300B, and relay lenses 260, 270. The dichroic mirrors 210, 220 are each formed by, for example, stacking a dielectric multilayer film on a glass surface. The dichroic mirrors 210, 220 have the property of selectively reflecting the colored light in a predetermined wavelength band, and transmitting the colored light in the other wavelength band. Here, the dichroic mirror 210 reflects the green light and the blue light, and the dichroic mirror 220 reflects the green light.

The light L emitted from the light source device 100 enters the dichroic mirror 210. The red light R out of the light L enters the mirror 230 after passing through the dichroic mirror 210, and is then reflected by the mirror 230, and further enters the field lens 300R. The red light R is collimated by the field lens 300R, and then enters the liquid crystal light valve 400R.

The green light G and the blue light B out of the light L are reflected by the dichroic mirror 210, and then enter the dichroic mirror 220. The green light G is reflected by the dichroic mirror 220, and then enters the field lens 300G. The green light G is collimated by the field lens 300G, and then enters the liquid crystal light valve 400G.

The blue light B having passed through the dichroic mirror 220 passes through the relay lens 260 and is then reflected by the mirror 240, and then further passes through the relay lens 270 and is then reflected by the mirror 250 to thereby enter the field lens 300B. The blue light B is collimated by the field lens 300B, and then enters the liquid crystal light valve 400B.

The liquid crystal light valves 400R, 400G, and 400B are each formed of a light modulation device such as a transmissive liquid crystal light valve. The liquid crystal light valves 400R, 400G, and 400B are electrically connected to a signal source (not shown) such as a PC for supplying an image signal including the image information, and perform spatial modulation on the incident light pixel-by-pixel based on the image signal supplied thereto to thereby form the red image, the green image, and the blue image, respectively. The colored lights (the images thus formed) modulated by the respective liquid crystal light valves 400R, 400G, and 400B enter the color combining element 500.

The color combining element 500 is formed of a dichroic prism or the like. The dichroic prism has a structure having four triangular prisms bonded to each other. The surfaces bonded to each other in the triangular prisms form the internal surfaces of the dichroic prism. A mirror surface for reflecting the red light R and transmitting the green light G and a mirror surface for reflecting the blue light B and transmitting the green light G are formed perpendicular to each other in the internal surfaces of the dichroic prism. The green light G having entered the dichroic prism passes through the mirror surfaces, and is emitted directly. The red light R and the blue light B having entered the dichroic prism are selectively reflected or transmitted on the mirror surfaces, and then emitted in the same direction as the emission direction of the green light G. In such a manner as described above, the three colored lights (images) are overlapped to thereby be combined with each other, and the colored light thus combined is projected by the projection optical system 600 on the target projection surface 700 in an enlarged manner.

In the projector PJ according to the present embodiment, the image display is performed in such a manner as described above.

According to the light source device 100 having such a configuration as described above, since the light saturation phenomenon is prevented from occurring in the light emitting element 60, the light intensity is stabilized, and the light source with higher luminance efficiency compared to the related art can be obtained.

Further, according to the projector PJ having such a configuration as described above, since the light saturation phenomenon is prevented from occurring, the light intensity of the light emitted from the light source device is stabilized, and the variation in brightness is suppressed to thereby make it possible to perform high-quality image display.

It should be noted that although it is assumed in the present embodiment that the exit surface 26b has the aspherical shape in the collimating lens 26, it is also possible to assume that the lens having the entrance surface shaped like an aspherical surface is used.

Figure 8:
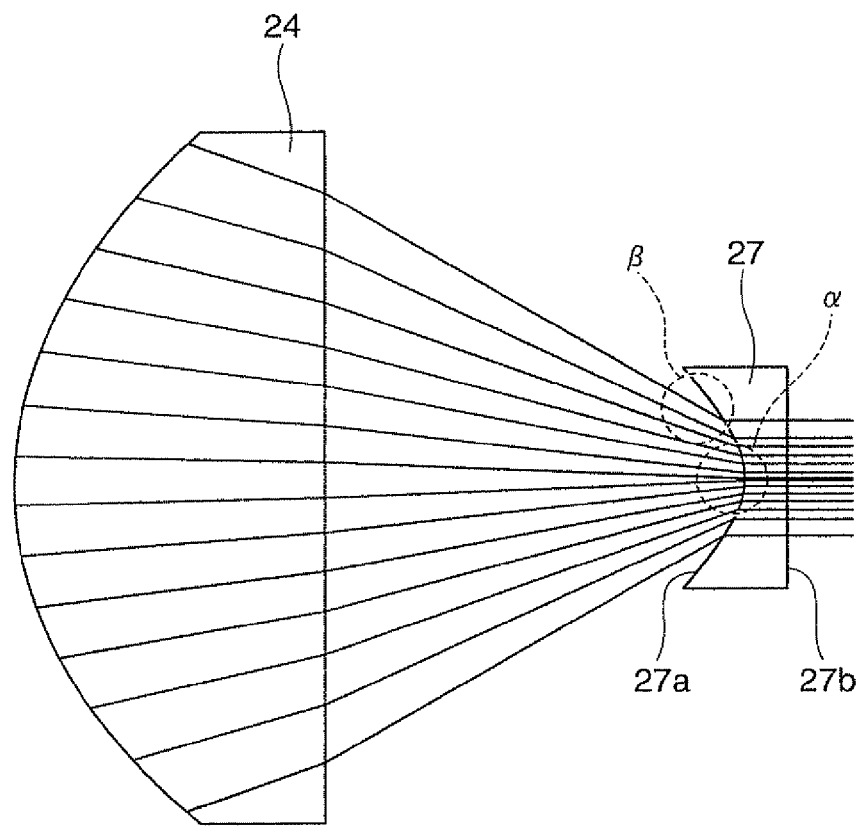
FIG. 8 is an explanatory diagram showing a modified example of the light source device according to the first embodiment.

A collimating lens 27 shown in FIG. 8 is a plano-convex lens having an entrance surface 27a formed to have the quadric surface of revolution fulfilling the relationship of Formula (3), and an exit surface 27b formed as a plane surface. By using such a collimating lens 27, an advantage that the light beam is highly parallelized can easily be obtained compared to the case of using the collimating lens 26 described above.

Specifically, the bundle of the light beams emitted from the collimating lens 26 described above is changed in the proceeding direction twice due to the refraction in the entrance surface 26a and the refraction in the exit surface 26b of the collimating lens 26, and is then emitted therefrom. On the other hand, the bundle of the light beams emitted from the collimating lens 27 is collimated by the refraction on the entrance surface 27a of the collimating lens 27, and is therefore changed in the proceeding direction only once, and then emitted. Therefore, it is difficult for the disturbance in parallelization due to the molding error of the lens to occur. Therefore, by using the collimating lens 27, it becomes possible to obtain the light beam with a higher degree of parallelization.

Figure 9A:
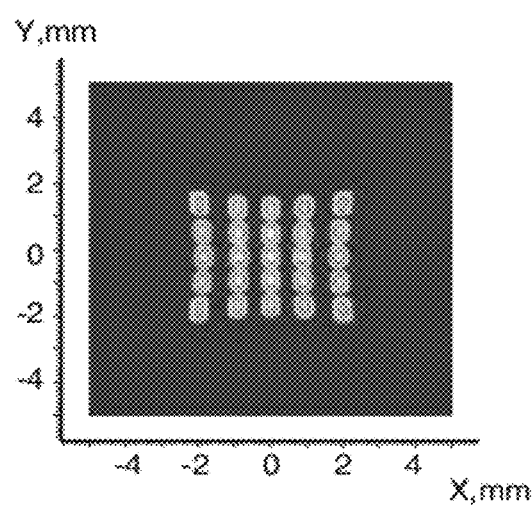
FIGS. 9A through 9C are diagrams showing a calculation result representing the light intensity of the excitation light in a plane perpendicular to a principal ray of the excitation light.
Figure 9B:
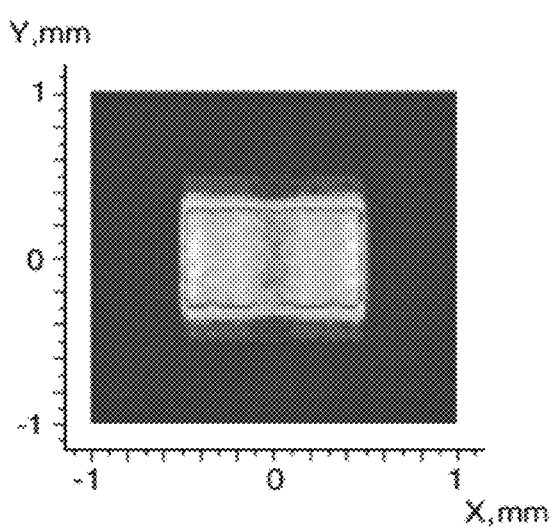
Figure 9C:
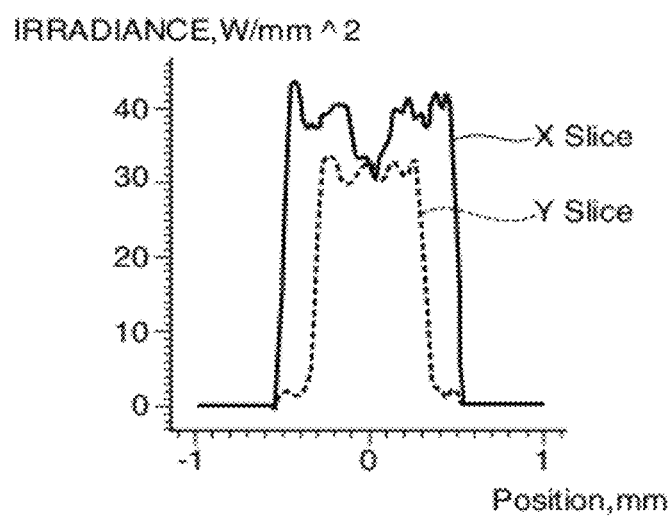

On the other hand, the bundle of the light beams emitted from the collimating lens 27 described above has the light intensity distribution shown in FIGS. 9A through 9C. FIGS. 9A through 9C show the calculation result representing the light intensity of the excitation light in a plane perpendicular to the principal ray of the excitation light in the case of using the collimating lens 27, and correspond to FIGS. 6A through 6C, respectively.

As shown in FIG. 9A, if the collimating lens 27 is used, the light intensity distribution of the excitation light is discretely disposed, and the pincushion distortion is caused therein at the spatial position before entering the first lens array 32. This is because in the collimating lens 27 a substantial difference in the incident angle of the incident light beam is caused between the center (reference symbol α) and the periphery (reference symbol β) of the collimating lens 27 as shown in FIG. 8, and therefore, the intensity distribution in which the intensity is high in the central part and low in the periphery is apt to occur in the bundle of the light beams emitted from the collimating lens 27.

Further, as shown in FIGS. 9B and 9C, at the spatial position before entering the light irradiation surface 60a, the excitation light has the light intensity distribution less homogeneous than the light intensity distribution shown in FIGS. 6B and 6C although approximating the light intensity distribution shaped like a top hat homogenous in the area having the roughly square shape of 1 mm×1 mm. That may be attributed to the consequence of reflecting the unevenness (see FIG. 9A) of the light intensity before entering the first lens array 32.

The quadric surface of revolution of the aspherical surface of such a collimating lens 27 is determined by the following process based on Formula (3).

Specifically, the shape of the collecting lens 24, and the refractive index n, the thickness of the central part, and the installation location of the collimating lens 27 are firstly determined in advance. Further, a concave lens having the curvature of the entrance surface, the refractive index, and the thickness of the central part identical thereto, and at the same time having the spherical exit surface is assumed as an alternative of the collimating lens 27. Then, the curvature of the entrance surface of the concave lens is obtained, with which the conversion into parallel light is possible if no spherical aberration exists in the case in which the concave lens described above is disposed at the installation location of the collimating lens 27 with respect to the collecting lens having the shape identical to the shape determined in advance. The value of the curvature obtained in such a manner is used as the paraxial curvature c.

Then, the conic constant K is obtained. Here, in the collimating lens 27, the entrance surface 27a has the aspherical shape set based on Formula (3), and therefore, the excitation light entering the collimating lens 27 is changed in the proceeding direction to the roughly parallel direction due to the refraction on the entrance surface 27a, and is hardly subjected to the refraction on the exit surface 27b. As a result, the relationship between the refractive index n and the conic constant K of the collimating lens 27 becomes constant. It should be noted that the conic constant K of the aspherical surface of the reflecting surface of the collimating lens 27 is roughly determined by $K=-n^2$.

Therefore, in the present modified example, the conic constant K can be obtained by $K=-n^2$, and there is no need to perform the simulation required in the case of using the collimating lens 26. The conic constant K of the aspherical surface of such a collimating lens 27 is in a range of $-2.1>K>-3.8$. Therefore, in the case of adopting the aspherical shape as the entrance surface 27a, it is preferable to adopt a hyperboloid of revolution as the entrance surface 27a.

Further, although in the present embodiment it is assumed that the light source 10Ba shown in FIG. 2 is used as the light source of the excitation light, it is also possible to use the light source section shown in FIGS. 10 and 11A through 11C described below.

Figure 10:
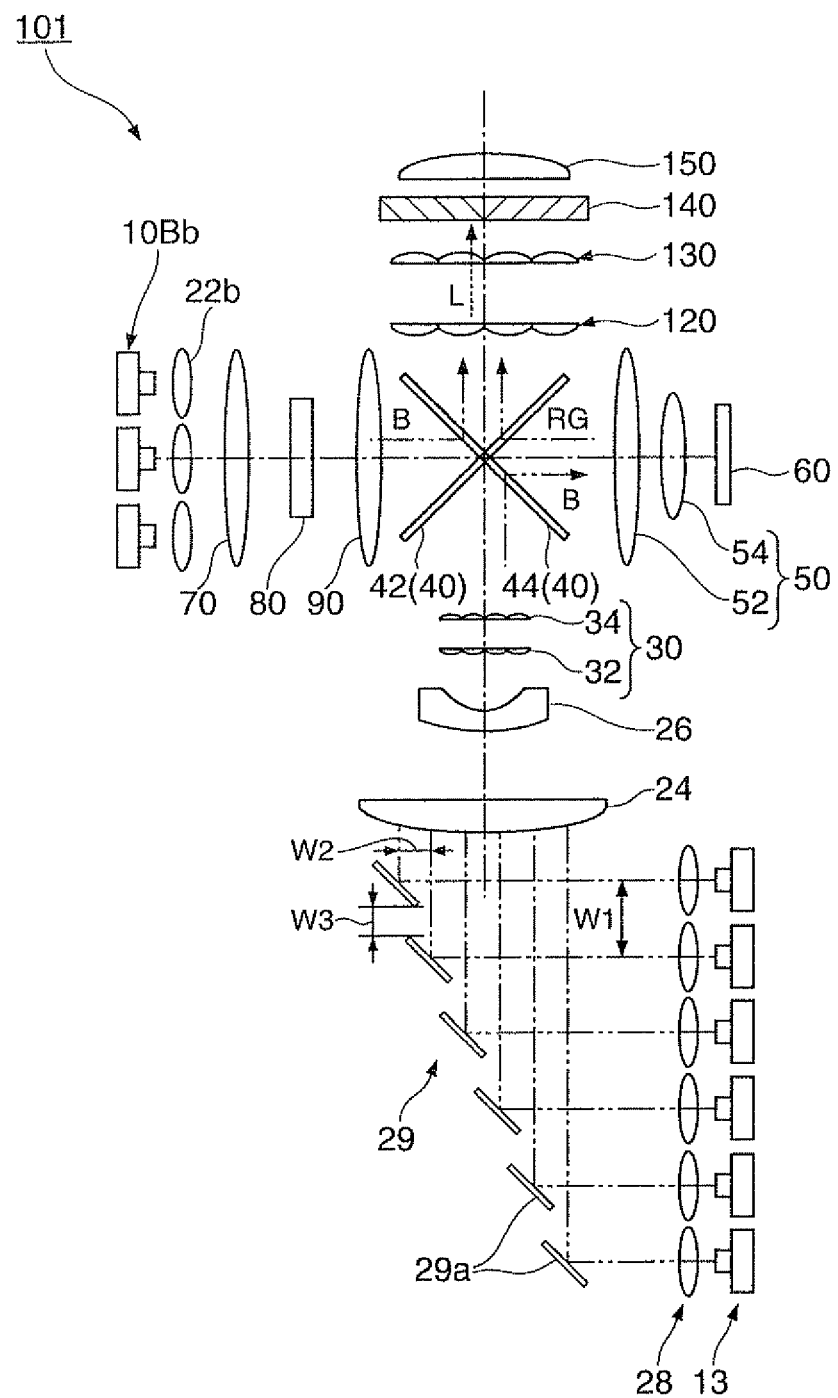
FIG. 10 is an explanatory diagram showing a modified example of the light source device according to the first embodiment.

FIG. 10 is a schematic diagram showing a light source device 101. In the light source device 101, a light source 13 is used as the light source for emitting the excitation light instead of the light source 10Ba described above. There is adopted a configuration in which the blue light B emitted from the light source 13 is collimated by a collimator lens array 28, and is then reflected by a reflecting section 29 including a plurality of reflecting mirrors 29a to thereby enter the collecting lens 24.

The reflecting mirrors 29a are disposed so as to correspond to the blue lights B emitted from the respective laser sources 12, and have a function of changing the pitch of the principal rays from W1 to W2 (W1>W2). The reflecting mirrors 29a are disposed at a distance of W3, and have a configuration of reflecting the lights by the respective reflecting mirrors 29a to thereby change the pitch of the principal rays.

Figure 11A:
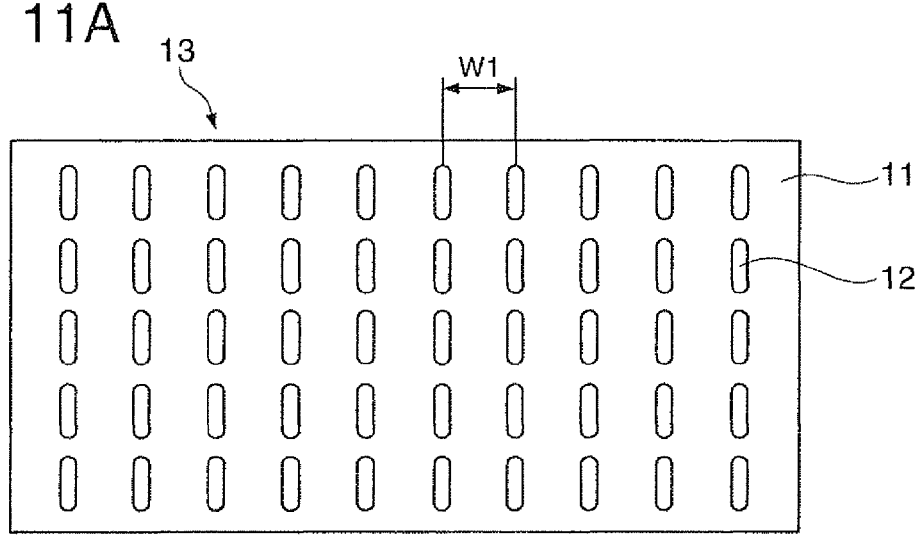
FIGS. 11A through 11C are explanatory diagrams showing a modified example of the light source device according to the first embodiment.

FIG. 11A is a plan view of the light source 13 provided to the light source device 101. As shown in FIG. 11A, the light source 13 is a laser source array having laser sources 12 arranged in a 10×5 two-dimensional array (50 in total) so as to form a rectangular shape on a substrate 11. The laser sources 12 each have a rectangular planar shape, and are arranged so that the long axis directions thereof are the same. Further, the laser sources 12 are arranged in the short axis direction at the pitch W1.

Figure 11B:
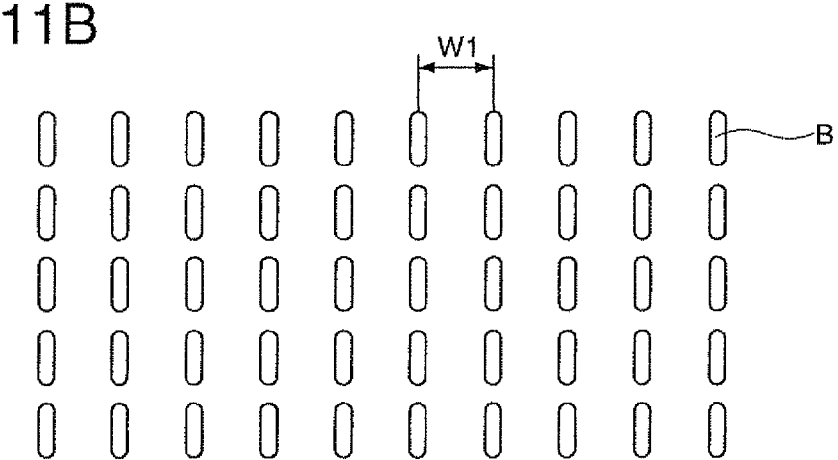

In such a light source 13, the laser beams (the blue lights B) emitted from the respective laser sources 12 become to have the pitch of the principal rays corresponding to the arrangement pitch W1 of the laser sources 12 as shown in FIG. 11B.

Figure 11C:
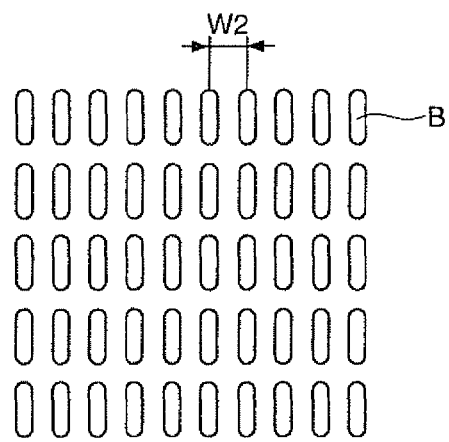

Therefore, as shown in FIG. 11C, the laser beams (the blue lights B) reflected by the reflecting sections 29 become to have the pitch W2 of the principal rays, and the light intensity of the whole of the bundle of the light beams increases.

In the light source device 101 having such a configuration, since the density of the light emitted from the light source 13 can be increased, there can be obtained the light source device capable of increasing the light intensity of the light applied to the light emitting element 60 to thereby emit the high-intensity fluorescence.

Further, although in the present embodiment it is assumed that the red light R and the green light G are included in the fluorescence RG emitted by the light emitting element 60, this is not a limitation. It is also possible to assume that the fluorescence including the green light G alone is emitted as in the case of, for example, a light emitting element 63 of a light source device 102 shown in FIG. 12.

Figure 12:
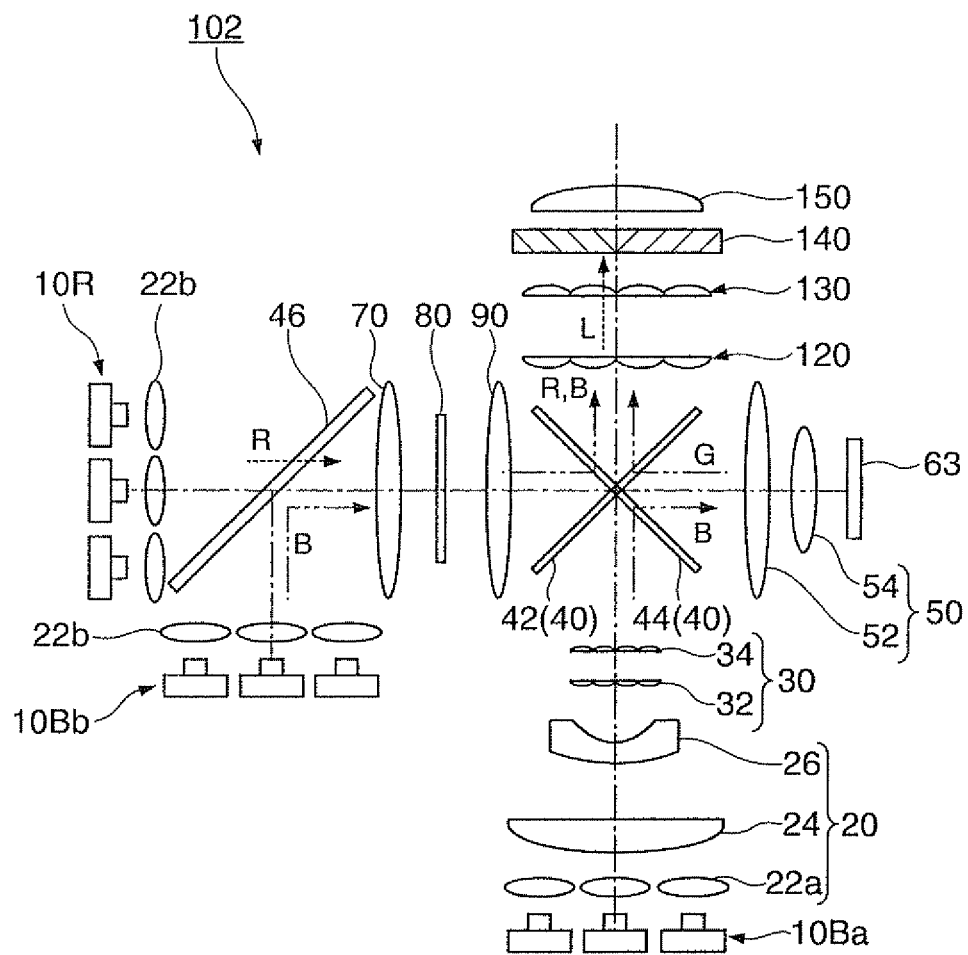
FIG. 12 is an explanatory diagram showing a modified example of the light source device according to the first embodiment.

On this occasion, it is preferable that a light source 10R for emitting the red light is prepared besides the light source 10Bb for emitting the blue light used for the display as shown in FIG. 12. Specifically, it is preferable to adopt the configuration of disposing the a dichroic mirror 46 for reflecting the blue light and transmitting the other light on both of the light paths of the blue light B emitted from the light source 10Bb and the red light R emitted from the light source 10R to thereby mix the blue light and the red light on the light paths, and then guiding the light thus mixed to the collecting lens 70. The light source 10R can be a laser source array or have a different configuration providing the light source 10R can emit the red light.

Further, although in the present embodiment there is adopted the light emitting element 60 having the reflective configuration of emitting the fluorescence to the side where the excitation light enters, it is also possible to assume that there is adopted the transmissive configuration of emitting the fluorescence to the surface opposed to the surface where the excitation light enters.

Figure 13:
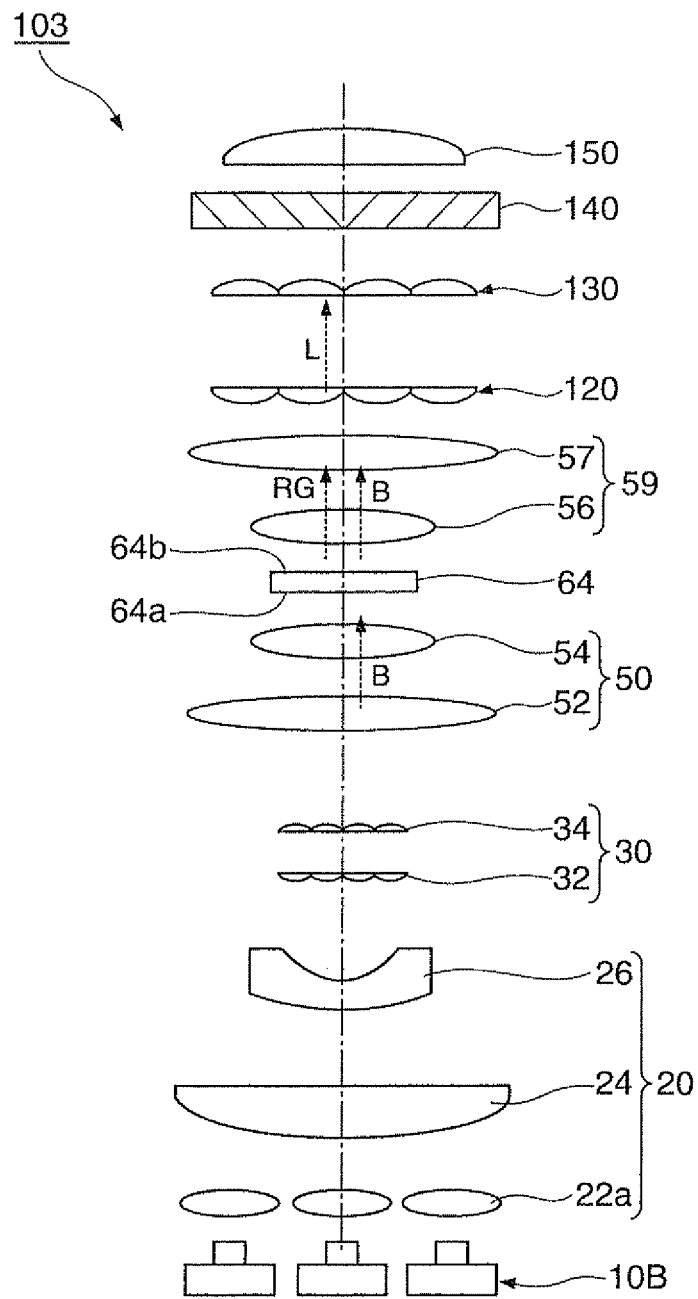
FIG. 13 is an explanatory diagram showing a modified example of the light source device according to the first embodiment.

FIG. 13 is a schematic diagram of a light source device 103 having a transmissive light emitting element 64.

As shown in the drawing, in the light source device 103, the excitation light (the blue light B) emitted from the light source 10B enters one (an entrance surface 64a) of the surfaces of the light emitting element 64 via the collimating optical system 20, the lens integrator 30, and the overlapping optical system 50. In the light emitting element 64, a part of the excitation light is absorbed, and is then converted into the fluorescence RG including the red light and the green light, and the rest of the excitation light is transmitted therethrough without being absorbed. Therefore, the white light L obtained by mixing the excitation light (the blue light B) not absorbed and the fluorescence RG is emitted from the other (an exit surface 64b) of the surfaces of the light emitting element 64.

The light L emitted from the light emitting element 64 is prevented from spreading by a pickup optical system 59 including first and second pickup lenses 56, 57, and is then emitted via the lens arrays 120, 130, the polarization conversion element 140, and the overlapping lens 150.

Since the light intensity of the excitation light emitted from the light source 10B is averaged by the lens integrator 30, and then the excitation light is made to enter the fluorescent layer provided to the light emitting element 64, even such a light source device 103 can be made to have high luminance efficiency.

Further, although in the present embodiment, the collecting lens 24 and the collimating lens 26 included in the collimating optical system 20 form an afocal optical system of a so-called Galileo type, it is also possible to assume that a convex lens is used instead of the collimating lens 26 to thereby form an afocal optical system of a so-called Kepler type.

Further, although in the present embodiment it is assumed that the lens plane of the first lens array 32 and the light irradiation surface 60a of the light emitting element 60 are in a conjugate relationship via the light collection optical system, the advantage obtained by overlapping the excitation light via the first lens array 32 can be expected even if the excitation light is not imaged on the light irradiation surface 60a, and the light intensity of the excitation light tends to be averaged. Therefore, it is possible to prevent the light saturation phenomenon in the light emitting element 60 to thereby obtain a light source with high luminance efficiency.

Further, although in the present embodiment it is assumed that the excitation light thus collected is formed to have a roughly square shape with the irradiation area of 1 mm×1 mm, and the size thereof is roughly equal to the planar area of the fluorescent layer 62, even if it is assumed, for example, that the irradiation area of the excitation light is slightly larger than the fluorescent layer 62, the light saturation in the light emitting element 60 can be prevented, and therefore, the improvement in the luminance efficiency can be expected.

Further, in the present embodiment, it is arranged that the planar shape of a small lens of the first and second lens arrays 32, 34 and the planar shape of the light irradiation surface 60a are roughly similar to each other. However, although a part of the excitation light is wasted if they are not similar to each other, improvement in the luminance efficiency is expected since the light saturation in the light emitting element 60 is prevented.

Further, although it is assumed in the present embodiment that the concave surface of the collimating lens 26 is designed using Formula (3) described above, it is also possible to use other generally known design methods of the aspherical surface.

Second Embodiment

Figure 14:
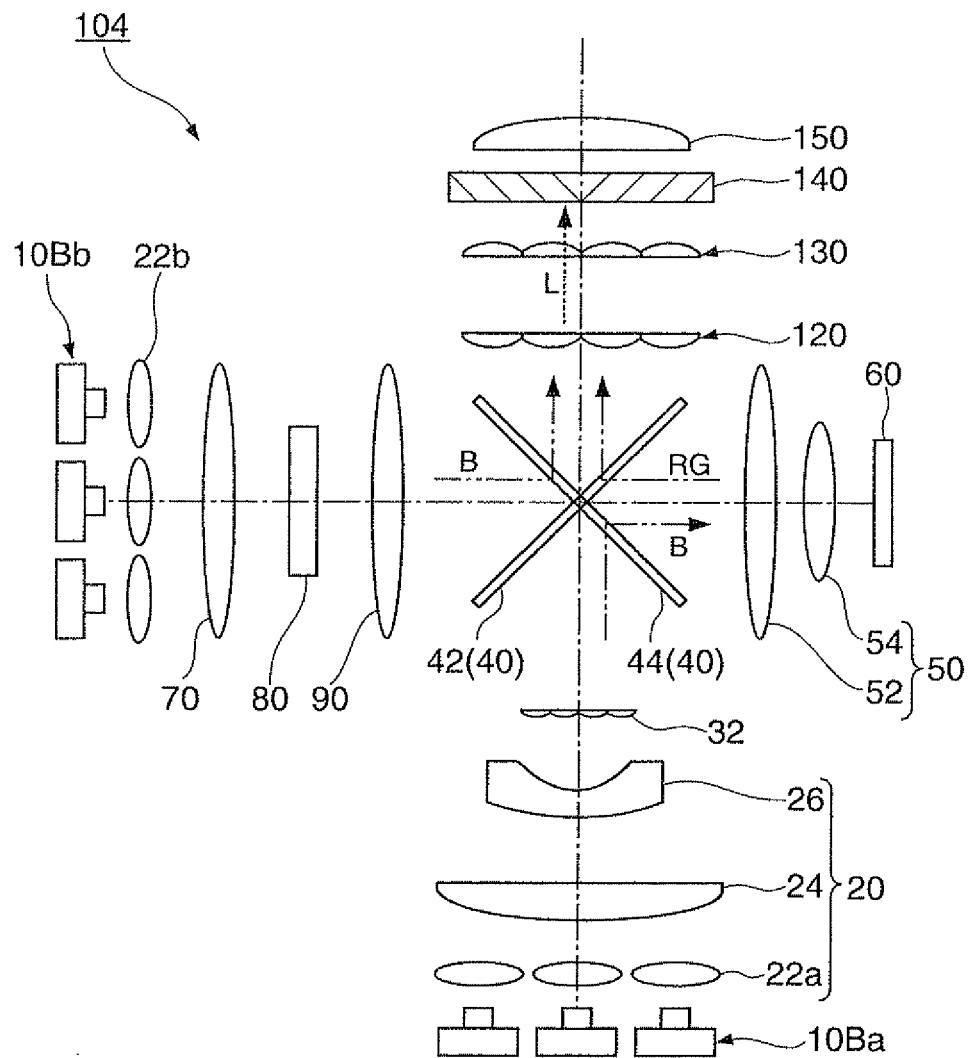
FIG. 14 is a schematic diagram showing a light source device according to a second embodiment of the invention.

FIG. 14 is an explanatory diagram of a light source device according to a second embodiment of the invention. In the following explanation, the constituents common to the present embodiment and the first embodiment are denoted by the same reference symbols, and the detailed explanation therefor will be omitted.

As shown in FIG. 14, a configuration of a light source device 104 is partially common to the light source device 100 according to the first embodiment. The difference is that the lens integrator does not form a pair, and the first lens array 32 is used alone. In the present embodiment, the overlapping optical system 50 functions as the light collection optical system of the embodiment of the invention.

Figure 15A:
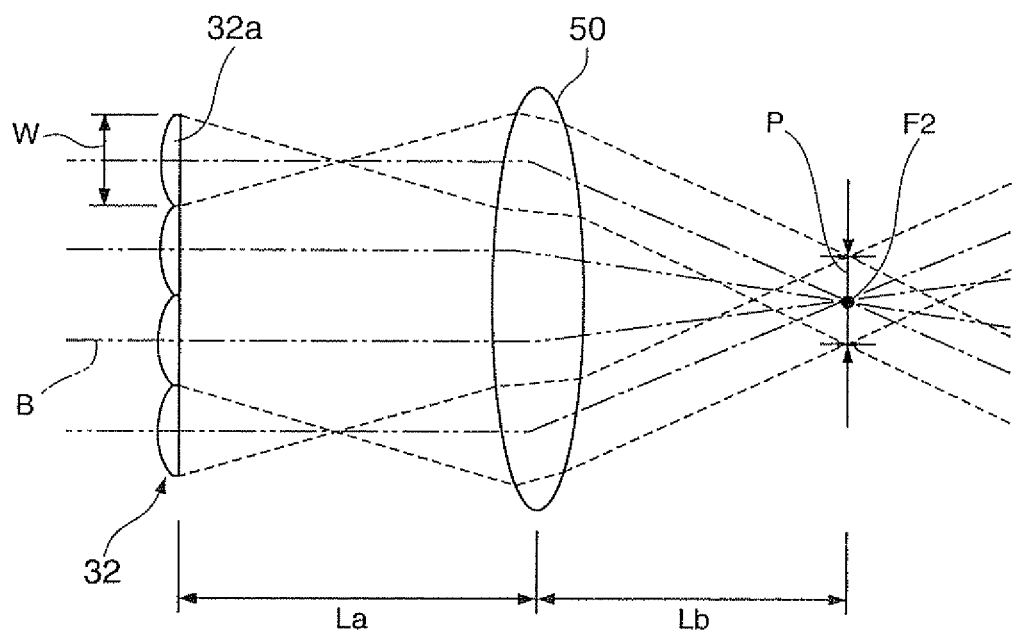
FIGS. 15A and 15B are explanatory diagrams showing a behavior of excitation light having entered a lens integrator.
Figure 15B:
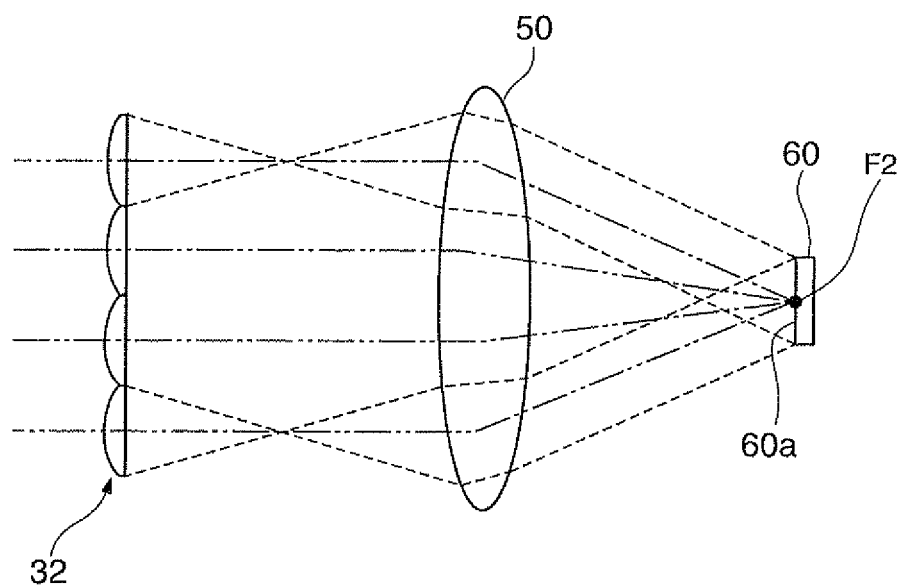

FIGS. 15A and 15B are explanatory diagrams showing the function of the first lens array 32 and the overlapping optical system 50. In FIGS. 15A and 15B, the overlapping optical system 50 is schematically illustrated as a single convex lens for the sake of simplification. It is assumed that the overlapping optical system 50 has no spherical aberration, or the spherical aberration thereof is reduced by correction.

As shown in FIG. 15A, in the optical system configured including the first lens array 32 and the overlapping optical system 50, there is adopted a configuration in which the excitation light (the blue light B) entering the first lens array 32 is parallelized, and the principal rays of the excitation lights transmitted through the first lens array 32 and the overlapping optical system 50 pass through a focal point F2 of the overlapping optical system 50. In other words, in the optical system having the first lens array 32 in one end of the optical system and the overlapping optical system 50 in the other end of the optical system, the object plane is set to infinity. In other words, it is arranged that the optical system configured including the first lens array and the overlapping optical system 50 is object-side telecentric. In such an optical system, the incident excitation light (the blue light B) enters the overlapping optical system 50 after transmitted through the first lens array 32, and the excitation light emitted from the overlapping optical system 50 passes through an exit pupil P with a certain width related to the overlapping optical system 50.

In such a configuration, the width of the exit pupil P is determined to be a certain size in accordance with the numerical aperture NA and the focal distance Lb of the overlapping optical system 50. Further, the shape of the exit pupil P becomes similar to the small lense 32a constituting the first lens array 32. In other words, the width of the exit pupil P is always constant independently of the distance La between the overlapping optical system 50 and the first lens array 32. For example, the exit pupil P is designed to have a roughly square shape of 1 mm×1 mm.

Therefore, as shown in FIG. 15B, by disposing the light emitting element 60 having the same size as the exit pupil at the position of the focal point F2 of the overlapping optical system 50, and setting the plane conjugate to the light irradiation surface 60a to infinity, it becomes possible to reduce (eliminate the second lens array shown in FIG. 1) the number of lens arrays used compared to the case of the light source device 100 of the first embodiment. As a result, it is possible to average the light intensity of the excitation light with a small number of components, and irradiate the light emitting element 60 with the excitation light.

Figure 16A:
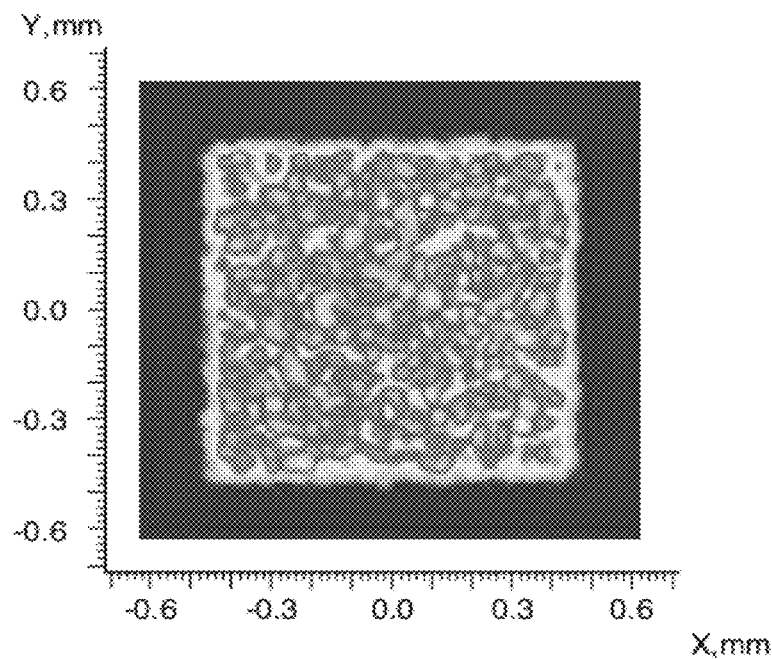
FIGS. 16A and 16B are diagrams showing a calculation result representing the light intensity of the excitation light in a plane perpendicular to a principal ray of the excitation light.
Figure 16B:
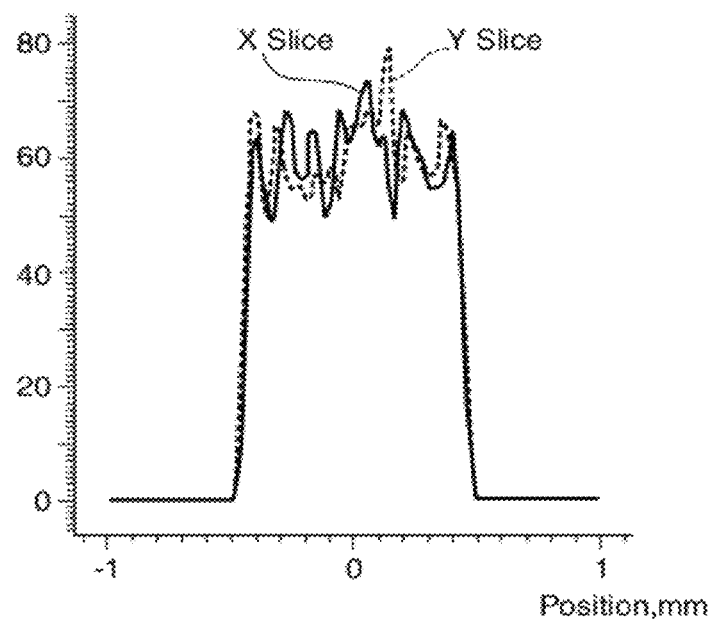

FIGS. 16A and 16B show the calculation result representing the light intensity of the excitation light in a plane perpendicular to the principal ray of the excitation light in the light source device 104, and correspond to FIGS. 6B and 6C, respectively.

As shown in FIG. 16B, in the spatial position before entering the light emitting element 60, the excitation light is formed to have an approximately square shape of 1 mm×1 mm, and has a continuous light intensity distribution approximating the light intensity distribution of a so-called top hat profile in which the light intensity is roughly uniform throughout the entire area as shown in FIG. 16C.

In the light source device 104, since the excitation light divided by the first lens array 32 into a plurality of light beams is collected by the overlapping optical system 50, the light intensity distribution is averaged. In addition, since the excitation light is not imaged in the exit pupil P shown in FIG. 15A, the image of the excitation light blurs, and the light intensity is easily averaged. Therefore, it becomes possible to preferably average the light intensity distribution even in the discrete light source such as the light source 10Ba.

According to the light source device 104 having such a configuration as described above, since the light saturation phenomenon is prevented from occurring, the light intensity is stabilized, and the light source with higher luminance efficiency compared to the related art can be obtained.

It should be noted that although in the present embodiment the explanation is presented assuming that the collimating lens 26 is used, it is also possible to assume that the collimating lens 27 shown in FIG. 8 is used. The collimating lens 27 having a concave entrance surface and a flat exit surface is capable of further enhancing the degree of parallelization of the excitation light transmitted through the collimating lens 27 than in the case of the collimating lens 26. Therefore, it becomes easier to perform averaging of the excitation light using the first lens array 32 and the overlapping optical system 50 (the light collection optical system).

Further, in the present embodiment, it is assumed that the planar area of the light irradiation surface 60a of the light emitting element 60 is roughly equal to the size of the exit pupil P. However, even in the case, for example, in which the exit pupil P is larger, improvement in the luminance efficiency is expected since the light saturation in the light emitting element 60 is prevented although a part of the excitation light is wasted.

Further, although it is assumed in the present embodiment that the light irradiation surface 60a is disposed so as to overlap the focal point F2 of the overlapping optical system 50 (the light collection optical system), even if the light irradiation surface 60a is displaced from the focal point F2, the advantage obtained by overlapping the excitation light via the first lens array 32 can be expected, and the light intensity of the excitation light tends to be averaged. Therefore, it is possible to prevent the light saturation phenomenon in the light emitting element 60 to thereby obtain a light source with high luminance efficiency.

Although the explanation is hereinabove presented regarding the preferable embodiments of the invention with reference to the accompanying drawings, it is obvious that the invention is not limited to the embodiments described above. The various shapes and combinations of the constituents presented in the embodiments described above are provided for exemplification only, and can be modified in various ways within the spirit or scope of the invention in accordance with design needs and so on.

The entire disclosure of Japanese Patent Application No. 2010-265165, filed on Nov. 29, 2010 is expressly incorporated by reference herein.

What is claimed is:

1. A projector comprising:
a light source section for emitting excitation light in a collimated fashion;
a first lens array for receiving and dividing the excitation light from the light source section into a plurality of partial light beams;
a second lens array, provided in a position downstream of the first lens array, for receiving the plurality of partial light beams;
a dichroic mirror, provided in a position downstream of the second lens array, for receiving the plurality of partial light beams coming from the second lens array;
an overlapping optical system, provided in a position downstream of the dichroic mirror, for receiving the plurality of partial light beams coming from the dichroic mirror;
a light emitting element, provided in a position downstream of the overlapping optical system, for emitting fluorescence upon receiving the plurality of partial light beams coming from the overlapping optical system, a path of the fluorescence including the overlapping optical system and the dichroic mirror in this order;
a light modulator; and
a projection optical system for projecting the fluorescence modulated by the light modulator, wherein:
the overlapping optical system is configured to overlap the partial light beams with each other on the light emitting element and to collimate the fluorescence emitted by the light emitting element,
the dichroic mirror is configured to separate the collimated fluorescence from the plurality of partial light beams, and
the light modulator is configured to modulate the fluorescence coming from the dichroic mirror, in accordance with signals including image information.

2. The projector according to claim 1, wherein
the second lens array and the overlapping optical system constitutes a light collection optical system, and
a lens plane of the first lens array and a light irradiation surface of the light emitting element are in a conjugate relationship via the light collection optical system.

3. The projector according to claim 2, wherein
a planar shape of a small lens constituting the first lens array is similar to a shape of the light irradiation surface in a plan view, and
an area of the light irradiation surface in the plan view and an irradiation area of the excitation light illuminating a plane parallel to the light irradiation surface at a same spatial position as the light irradiation surface are substantially equal to each other.

4. The projector according to claim 2, wherein
the light source section includes:
a plurality of solid-state light sources for emitting the excitation light;
a collecting lens for collecting the excitation light from the plurality of solid-state light sources; and
a collimating lens for collimating the excitation light from the collecting lens; and
the collimating lens has a concave surface having a shape of a quadric surface of revolution in either one of an entrance surface and an exit surface.

5. The projector according to claim 4, wherein
the collimating lens has a spherical convex surface as the entrance surface, and the concave surface as the exit surface.

6. The projector according to claim 1, wherein
the second lens array and the overlapping optical system constitutes a light collection optical system,
the light emitting element is disposed so that a light irradiation surface overlaps a focal position of the light collection optical system, and
an integrate optical system has a plane, which is conjugate to the light irradiation surface, set to infinity, the integrate optical system having the first lens array in one end of the integrate optical system and the light collection optical system in the other end of the integrate optical system.

7. The projector according to claim 6, wherein
a planar shape of a small lens constituting the first lens array is similar to a shape of the light irradiation surface of the light emitting element in a plan view, and
an area of the light irradiation surface of the light emitting element in the plan view is substantially equal to a size of an exit pupil of the integrate optical system.

8. The projector according to claim 6, wherein
the light source section includes:
a plurality of solid-state light sources for emitting the excitation light;
a collecting lens for collecting the excitation light from the plurality of solid-state light sources; and
a collimating lens for collimating the excitation light from the collecting lens; and
the collimating lens has a concave surface having a shape of a quadric surface of revolution in either one of an entrance surface and an exit surface.

9. The projector according to claim 8, wherein
the collimating lens has the concave surface as the entrance surface, and a flat surface as the exit surface.

10. The projector according to claim 4, wherein
the concave surface has a shape represented by Formula (1):

$$Z - \frac{c \cdot r^2}{1 + \sqrt{1 - (1+K) \cdot c^2 \cdot r^2}} = 0 \quad (1)$$

where c represents a paraxial curvature, K represents a conic constant, and r and Z represent coordinate values in an rθZ cylindrical coordinate system taking an intersecting point between the concave surface and a center axis of the parallel beam of light as an origin, the center axis as a Z axis, and an axis perpendicular to the center axis as an r axis.

11. The projector according to claim 8, wherein
the concave surface has a shape represented by Formula (1):

$$Z - \frac{c \cdot r^2}{1 + \sqrt{1 - (1+K) \cdot c^2 \cdot r^2}} = 0 \quad (1)$$

where c represents a paraxial curvature, K represents a conic constant, and r and Z represent coordinate values in an rθZ cylindrical coordinate system taking an intersecting point between the concave surface and a center axis of the parallel beam of light as an origin, the center axis as a Z axis, and an axis perpendicular to the center axis as an r axis.

* * * * *